(12) United States Patent
Greiner et al.

(10) Patent No.: US 6,286,089 B1
(45) Date of Patent: Sep. 4, 2001

(54) COUPLING FACILITY USING DYNAMIC ADDRESS TRANSLATION

(75) Inventors: Dan Frederick Greiner, San Jose; Kai Chiu Wong, Saratoga, both of CA (US)

(73) Assignee: Amdahl Corporation, Sunnyvale, CA (US)

( * ) Notice: Subject to any disclaimer, the term of this patent is extended or adjusted under 35 U.S.C. 154(b) by 0 days.

(21) Appl. No.: 09/382,077

(22) Filed: Aug. 24, 1999

(51) Int. Cl.$^7$ ............................ G06F 15/80; G06F 12/10
(52) U.S. Cl. ........................... 711/203; 709/213; 709/245
(58) Field of Search ................................. 709/200, 245, 709/249, 250, 213; 711/203, 207, 208, 210

(56) References Cited

U.S. PATENT DOCUMENTS

| | | | |
|---|---|---|---|
| 5,331,673 | * | 7/1994 | Elko et al. ........................ 714/43 |
| 5,737,600 | * | 4/1998 | Geiner et al. ................... 707/200 |
| 6,144,995 | * | 11/2000 | Maya et al. ...................... 709/213 |
| 6,185,562 | * | 2/2001 | Dahlen et al. .................... 707/8 |

* cited by examiner

*Primary Examiner*—Jack A. Lane
(74) *Attorney, Agent, or Firm*—David E. Lovejoy

(57) ABSTRACT

A system that employs virtual addressing for structures in a coupling facility. The system operates to share data among two or more processes that execute on central processing complexes. The central processing complexes each have an inter-system channel connected to a coupling facility. The coupling facilitcludes coupling facility receivers where each receiver connects to one of the inter-system channels for making transfers between the coupling facility and the central processing complexes. The coupling facility includes storage, connected to the coupling facility receivers, for storing control objects and data objects at real addresses in one or more structures, where the real address are translatable from corresponding virtual addresses. The coupling facility includes CPUs, connected to the coupling facility receivers and to the storage, for controlling the operation of the coupling facility. Each of the CPUs includes a dynamic address translator for translating the virtual addresses to the real addresses.

25 Claims, 8 Drawing Sheets

Conventional S/390 Page Table Entry (PTE):

Extended Real Addressing PTE:

40-Bit Extended-Real Address

COUPLING FACILITY USING DYNAMIC ADDRESS TRANSLATION

BACKGROUND OF THE INVENTION

The present invention relates to a coupling facility (CF) and specifically the addressing of objects within a coupling facility.

A coupling facility (CF) provides a structured means of connecting multiple central processing complexes (CPCs) to allow efficient interchange of data between multiple physical systems while maintaining coherency of the data across all systems. The coupling facility consists of high-speed inter-system (IS) channels, central processing units (CPUs), random-access memory (RAM) storage that is accessed by the IS channels and CPUs, and control software running in the CPUs.

A coupling facility structure represents a set of objects maintained on behalf of attaching systems. A structure is similar to a shared file in a direct-access storage device (DASD) except that structures are maintained in the coupling facility's storage. The coupling facility receives commands from attaching CPCs via the IS channels, executes the commands, and returns responses over the IS channels. The commands may create, write, read, update, or delete structures on behalf of the attaching CPCs. In response to certain commands, the CF may notify attaching CPCs of state changes in certain structure objects. Memory within the CF is categorized as either control storage or non-control storage.

Control storage is used to maintain CF objects that require byte-level processing by the CPUs. In a structure, entries comprise one class of objects that are maintained in control storage. Entries may contain name, key, index, and other values that must be examined and/or updated by the CPU to successfully complete a CF command. Such objects are hereafter referred to as control objects.

Non-control storage is used to maintain CF objects that do not require direct manipulation by the CPUs. In a structure, elements comprise another class of objects that may be maintained in non-control storage. Elements are not normally manipulated by the CPU during CF command execution and they may be moved directly between the IS channels and storage locations with no other CPU intervention. Such objects are hereafter referred to as data objects. If non-control storage is not present in a CF configuration, control storage is used to maintain all of the objects (control and data objects) in the CF's memory.

Storage in a coupling facility stores a maximum number of bytes, $2^{Max}$. In one example, Max is 44 so that 16 terabytes ($2^{44}$ bytes) of structure objects can be stored. To minimize real storage management overhead, storage is apportioned to structures in units of storage increments (SIs). The SI size is model-dependent. Typical CF models have used an SI size of 262, 144 bytes (256 kilobytes or 256 KB).

Coupling facility products from Amdahl, IBM and others have been implemented using S/390-based platforms but coupling facilities can be implemented on any hardware platform. The S/390 architecture is well-known to represent the foundation for robust, high-performance, high-reliability computing platforms. In S/390 architecture, central storage represents the CF concept of control storage and expanded storage represents the CF concept of non-control storage. In IBM-derived publications, such as U.S. Pat. No. 5,317,739, the coupling facility is referred to as shared electronic storage, shared external storage or structured external storage (SES).

The S/390 architecture provides virtual addressing capabilities using dynamic address translation (DAT) to form real storage addresses. Virtual addresses are limited to 31 bits, providing a maximum of 2,147,483,648 bytes (2 gigabytes or 2 GB) per virtual address space; real addresses are also limited to 31 bits, providing a maximum of 2 GB of central storage per domain where a domain is sometimes called a logical partition (LPAR). When the coupling facility executes in a domain limited to 2 GB of storage, the coupling facility is limited to 2 GB for all control objects of all structures. The control storage can be distributed among several separate structures or all of control storage can be consumed by a single structure.

In some Amdahl systems, coupling control code (ACCC) uses a "flat" memory model where virtual addresses map to identical real addresses. This type of memory model is commonly referred to as virtual-equals-real (V=R). In some systems, dynamic address translation has been used to segregate process stacks. In such systems, storage increments are allocated to structures dynamically in response to an attaching CPC systems' commands to allocate, expand, contract, or deallocate structures. As a result, the storage increments belonging to one structure can be discontiguous in both virtual and real memory.

A structure's storage by software execution can be made to appear to have objects stored in any order. Specifically, the storage order by software execution can map to the order of the CF command processing of functions, but such ordering by software execution results in additional overhead in the accessing of objects within a structure. Further, such a software implementation tends to subject the entire memory, including all structures, to errors in the event that errors occur in the coupling facility control code. Such software errors are difficult to detect and the errors in data caused by such software errors are difficult to correct.

In order to simplify the command processing logic of a coupling facility, it is desirable to avoid having objects span multiple SIs, that is, it is desirable to avoid having part of an object reside in one SI with the remainder of that object in another SI. In order to avoid such spanning by software execution, object space in structures must be reserved and hence portions of control objects' SI is unavailable for normal use and hence is wasted.

The addressing capabilities of some systems have been found inadequate for large amounts of data. Efforts have been made to overcome these inadequacies by providing additional addressing features. In S/390 architecture, although bits 0 and bits 24–31 of the page table entry are reserved, these bits can be used to provide additional addressing features. In one example, extensions to the S/390 dynamic address translation (DAT) hardware have been made to the format of the page table entry (PTE) used in the DAT process to provide an extended-real addressing (ERA) feature. The use of the extended-real addressing feature in a domain is mutually exclusive with the use of an expanded storage feature in that domain. Although the enablement of the extended-real addressing feature within a domain precludes the use of the expanded storage feature in that domain, other domains in which the ERA feature is not enabled continue to operate according to the S/390 architecture or with other addressing features enabled.

While various improvements have been made and proposed to enable addressing of large amounts of data, there is a need for improvements in coupling facilities that permit addressing large amounts of data efficiently and reliably.

SUMMARY

This invention is a system that employs virtual addressing for coupling facility structures. The system operates to share data among two or more processes that execute on central processing complexes. The central processing complexes each have an inter-system channel connected to a coupling facility. The coupling facility includes coupling facility receivers where each receiver connects to one of the inter-system channels for making transfers between the coupling facility and the central processing complexes. The coupling facility includes storage, connected to the coupling facility receivers, for storing control objects and data objects at real addresses in one or more structures, where the real address are translatable from corresponding virtual addresses. The coupling facility includes CPUs, connected to the coupling facility receivers and to the storage, for controlling the operation of the coupling facility. Each of the CPUs includes a dynamic address translator for translating the virtual addresses to the real addresses.

In the system, control objects and data objects in a structure are addressed in separate virtual address spaces. Multiple virtual spaces are used to map control objects or data objects that exceed any address limitation of a system, such as the 2 GB virtual address limitations of S/390 architecture. Access register translation (ART) is used to establish multiple virtual spaces in a linear continuum for a structure's control objects and data objects.

The allocation process of an individual structure using virtual addressing model is as follows:

During the initialization of the system, tables are built to track a free pool of real storage increments (SIs) that are available for structure allocation.

When an initial structure allocation command is received, sufficient storage increments are removed from the free pool to accommodate the requested structure size (if available). DAT and ART tables that are unique to this structure are constructed to map the newly-acquired SIs to virtual addresses. Separate virtual spaces are used to house the structure's control objects and data objects, the sizes of which are based on the requested ratio of entries to elements. One or more virtual spaces are used to map the control objects. If the structure has data objects, one or more virtual spaces are used to map the data objects. Both classes of objects appear to exist in linear addressing continuum, where each virtual space of particular object type immediately follows the previous one.

When a subsequent structure allocation command requests structure expansion, additional free SIs are removed from the free pool and the structure's DAT tables are extended, adding the newly-allocated storage to the structure while retaining the appearance of a virtual continuum in the control objects' or data objects' virtual spaces.

When a subsequent structure allocation command requests structure contraction, sufficient DAT table entries are invalidated to reduce the size of the affected objects. Storage increments that are no-longer needed to map the structure are returned to the system's free pool.

Reapportionment of entries and elements within a structure uses a combination of contraction and expansion to effect changes in the respective objects' DAT tables.

When a structure deallocation command is executed, the DAT and ART tables mapping the structure are invalidated, and the storage increments are returned to the system's free pool.

The present invention by having a structure's storage allocated in virtual addressing space, enforces structure segregation. The real storage increments that comprise a structure are only accessible within the virtual context of the structure; a structure's SIs cannot be accessed outside of the structure's virtual context. Segregation of structures is achieved by having a CPU execute only in a single structure's virtual context, as follows:

When a processor is waiting for work, it runs in a restricted common addressing mode where it has access only to the ACCC executable image, processor stack space, and a system-wide dynamic memory pool (that is, the heap).

When a processor executes a structure-related command, it establishes the virtual context of the structure by loading the appropriate control registers that regulate the DAT and ART hardware.

When a processor concludes the execution of a structure-related command, it reverts to the restricted, common address space.

Advantages in using virtual address translation to map the structure's components include:

Coupling control code is not required to simulate the DAT process to access discontiguous storage increments. Such operation can achieve substantial performance improvement by reducing the instruction path length needed to access various structure objects.

Objects which previously shared a common addressing space among all structures are now segregated into separate virtual spaces. Furthermore, control and data objects within the same structure are segregated into separate virtual spaces. By having a CPU run only in the virtual context of a single structure, and by segregating a structure's control and data objects, the possibility of undetected programming errors resulting in storage corruption is reduced, and system reliability is improved.

Unlike discontiguous SI models where amounts of control storage SIs can be used to avoid having an object span an SI, the virtual-memory model provides a linear continuum of addressing where control objects do not span SIs thereby avoiding the need for wasted control storage.

Advantages in using the extended-real addressing features in conjunction with virtual mapping of structures includes:

With the extended-real addressing implementation, expanded storage is eliminated, and all structure objects are maintained in central storage. This elimination of expanded storage eliminates the overhead of migrating pages of data objects between central and expanded storage that occurred during structure contraction.

The situation where data objects have been stored in control storage at non-contiguous locations never occurs and hence the need to find and collect those data objects in the control storage and to migrate them to non-control storage never arises. Hence, no time and resources are wasted on "clean up" operations.

The aggregate control storage size can be larger than two gigabytes whereas the previous CF implementations were restricted to an aggregate control storage size of approximately 2 GB. The use of extended-real addressing allows for an individual structure to have control objects greater than 2 GB (for example, cache structure directories, lock tables, etc.).

The foregoing and other objects, features and advantages of the invention will be apparent from the following detailed description in conjunction with the drawings.

BRIEF DESCRIPTION OF THE DRAWINGS

FIG. 10 through FIG. 14 depict representations of central and expanded storage when the coupling facility (CF) of FIG. 1 is operating in a storage mode that uses central storage and expanded storage.

DETAILED DESCRIPTION

Figure 1:
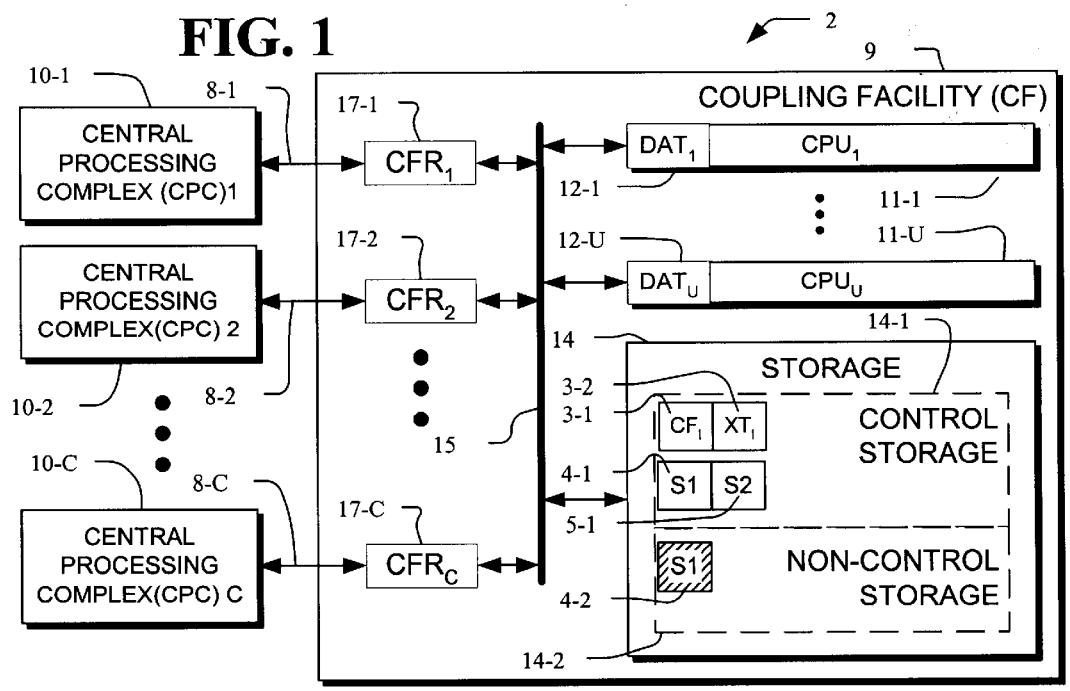
FIG. 1 depicts a block diagram representation of a system including central processing complexes (CPCs) interconnected using a coupling facility (CF).

Overall System—FIG. 1

In FIG. 1, the system 2 includes central processing complexes (CPCs) 10 interconnected to a coupling facility 9 through inter-system (IS) channels 8. The central processing complexes 10 include, for example, the complexes 10-1, 10-2, . . . , 10-C which in turn connect over the IS channels 8-1, 8-2, . . . , 8-C, respectively, to the coupling facility 9. In a typical embodiment, each of the central processing complexes 10-1, 10-2, . . . , 10-C is a computer system operating according to the S/390 architecture of IBM Corporation. In general, computers of any architecture having IS channels can be used for the central processing complexes 10. Each of the complexes 10 operates to execute one or more processes that may share data with other ones of the one or more processes. The sharing of data by two or more processes is carried out through operation of the coupling facility 9.

The coupling facility 9 includes one or more central processing units (CPUs) 11 including CPUs 11-1, . . . , 11-U. The CPUs 11-1, . . . , 11-U include the dynamic address translators (DAT) 12-1, . . . , 12-U, respectively. The coupling facility 9 includes coupling facility receivers (CFRs) 17-1, 17-2, . . . , 17-C that connect to the IS channels 8-c1, 8-c2, . . . , 8-C, respectively.

The central processing complexes 10, the CPUs 11 and the storage 14 are interconnected by the bus 15. The storage 14 is typically a large storage storing $2^{Max}$ bytes of data where MAX is, for example, 44. With MAX equal to 44, storage 14 stores up to 16 terabytes of data. Storage 14, in one embodiment, is partitioned into control storage 14-1 and non-control storage 14-2. A structure such as S1 can have a control object 4-1 in control storage 14-1 and a data object 4-2 in non-control store 14-2 and also, a structure such as S2 can have only a control object 5-1 in control storage 14-1 and no objects in non-control store 14-2. A predetermined low address location, $CF_1$, in storage 14 stores coupling facility code used for controlling the setup and operation of the coupling facility 9. Another predetermined low address location, $XT_1$, in storage 14 stores information used in the dynamic address translation. In particular, $XT_1$ stores a free pool that has entries that indicate the locations in storage 14 that are free and hence are available for allocation to structures.

In one embodiment of system 2 of FIG. 1, dynamic address translation is performed through the operation of the DATs 12-1, . . . , 12-U. Also for dynamic address translation, each of the CFRs 17-1, 17-2, . . . , 17-C can have a corresponding dynamic address translator (not shown) for direct address translation on the IS channels 8-1, 8-2, . . . , 8-C.

The system 2 employs virtual addressing for coupling facility structures such as structures S1 and S2. Dynamic address translation is used to map virtual addresses to real addresses for the structures. Control objects such as 4-1 and data objects such as 4-2 in a structure such as S4 are represented in separate virtual spaces of control storage 14-1 and non-control storage 14-2, respectively. The coupling facility control code, $CF_1$, and the coupling facilities free pool and dynamic address translation data, $XT_1$ are stored in a low address locations 3-1 and 3-2 of storage 14.

Figure 2:
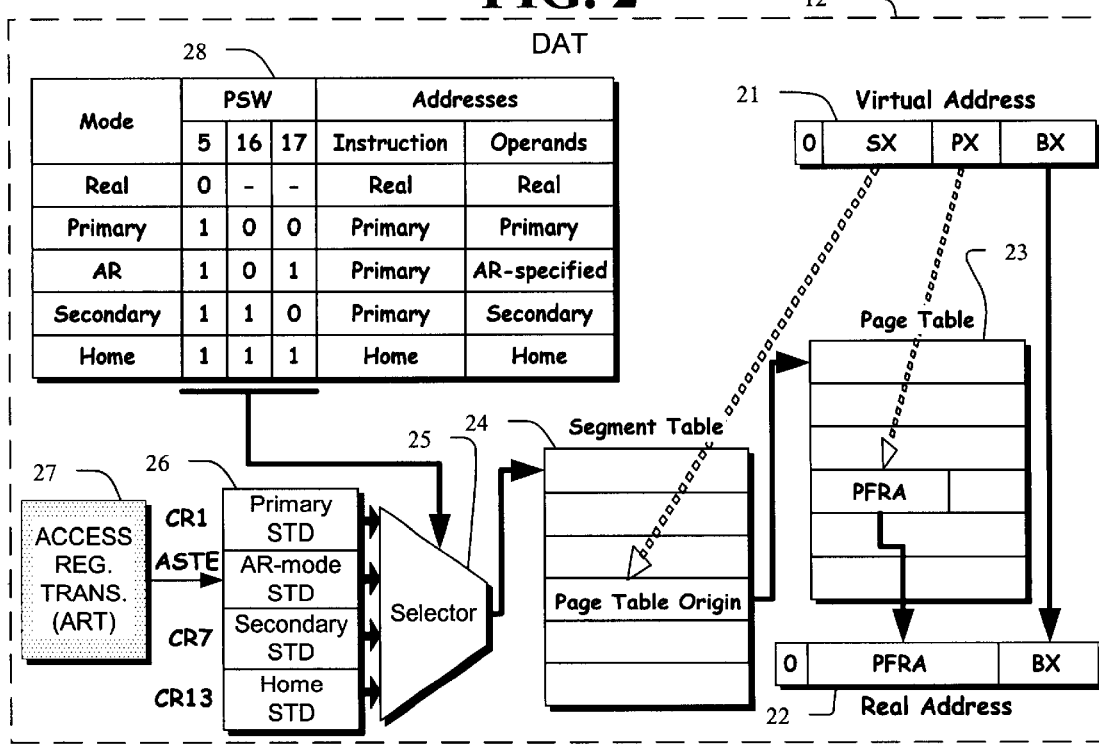
FIG. 2 depicts a block diagram representation of a dynamic address translator (DAT) typical of those used in the coupling facility (CF) of FIG. 1.

Dynamic Address Translator—FIG. 2

FIG. 2 depicts a block diagram representation of a dynamic address translator 12 that is typical of any of the DATs of FIG. 1. The dynamic address translator 12 of FIG. 2, includes a virtual address register 21 which accepts virtual addresses provided by the CPUs 11 of FIG. 1. The virtual address in register 21 is converted to a real address in the real address register 22 by operation of the DAT 12 of FIG. 2. In typical S/390 operation, the virtual address in virtual address register 21 is 31 bits and the real address in register 22 is 31 bits. However, the size of addresses is arbitrary and dependent on the system employed. For example, 40-bit, 44-bit, 64-bit and X-bit architectures can be employed where X is arbitrarily large and hence the maximum storage capacity of the storage 14 is arbitrarily large.

The dynamic address translator 12 of FIG. 2 includes a segment table 24 which stores page table origins, each pointing to a page table, like page table 23. The low-order bits BX in the real address register 22 are derived directly from the low-order BX bits in the virtual address register 21. The high-order bits PFRA in the real address register 22 are obtained from the page table location PFRA in the page table 23 as identified by the PX field in the virtual address register 21. The particular page table origin in the segment table is defined by the SX field in the virtual address register 21. A particular segment table 24 selected for use by the virtual address in register 21 is determined by the output from a selector 25. Selector 25 selects the segment table from the STD sources 26 based on the bits 5, 16 and 17 of the PSW 28. One of the modes of operation selects the STD in an access register mode (AR-mode) where the STD is determined by the ASTE address from an access register translator 27. In one particular embodiment, the real address value stored in register 22 is 40 bits.

Figure 3:
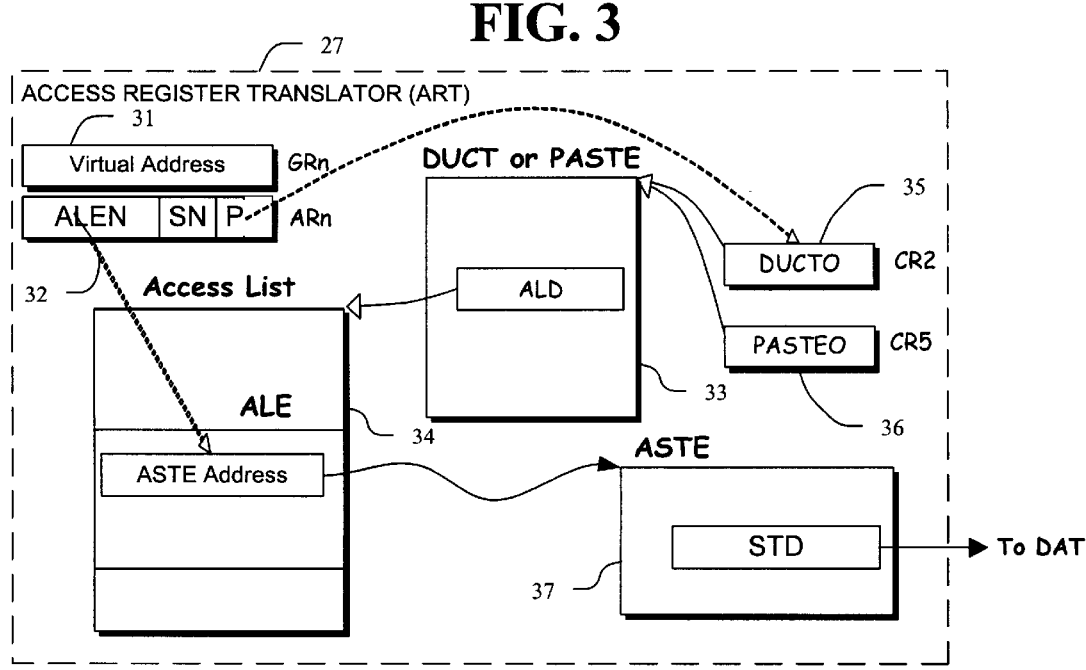
FIG. 3 depicts a block diagram representation of a basic access register translator (ART) used in the dynamic address translator (DAT) of FIG. 2.

Access Register Translator (ART)—FIG. 3

In FIG. 3, a block diagram representation of the access register translator 27 of FIG. 2 is shown. The access register translator receives the virtual address in a general register 31 as an input to an access register 32. The P field in the access register 32 selects the DUCT0 value from the CR2 control register 35 which locates an access list address ALD in the DUCT region 33. The ALD identifies the particular access list 34 which in turn is offset by the ALEN field of the virtual address to find the ASTE address in the access list 34. The STD from the ASTE is output to the DAT of FIG. 2.

Figure 4:
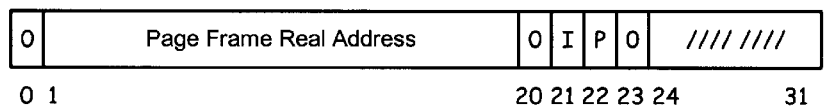
FIG. 4 depicts a block diagram representation of 40-bit extended-real addresses.
Figure 4:
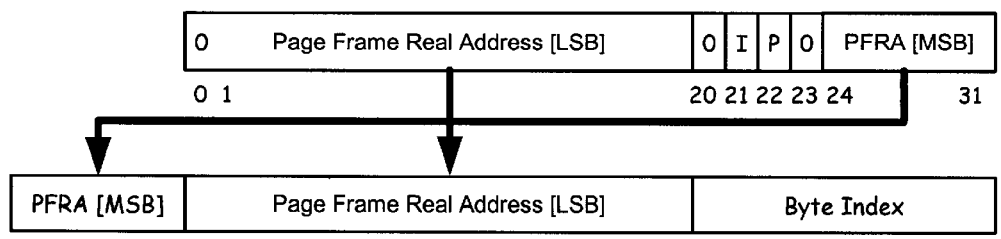

Address Extension—FIG. 4

In FIG. 4, a block diagram representation of a 40-bit extended-real address derived from a 31-bit address is shown. As indicated in the top page table entry of FIG. 4, the bits 24–31 of the 31 bit address of a conventional S/390 system are not normally used. As shown in the middle page table entry of FIG. 4, bits 24–31 are used to store the most significant bits (MSB) of the PFRA. The page frame real addresses from the conventional S/390 address are then designated as the least significant bits (LSB) which are then concatenated with the MSB PFRA to form the 40-bit extended-real address as shown in the bottom row of FIG. 4.

When the extended-real addressing feature is enabled for a domain, bits 24–31 of the PTE form the most-significant bits (msb) of the page-frame real address (PFRA); bits 0–19 of the PTE form the least-significant bits (1 sb) of the PFRA. The extended-real addressing DAT process concatenates this 28-bit PFRA with a 12-bit page offset to form a 40-bit real address, allowing for up to 1 terabyte ($2^{40}$ bytes) of memory to be addressed.

Figure 5:
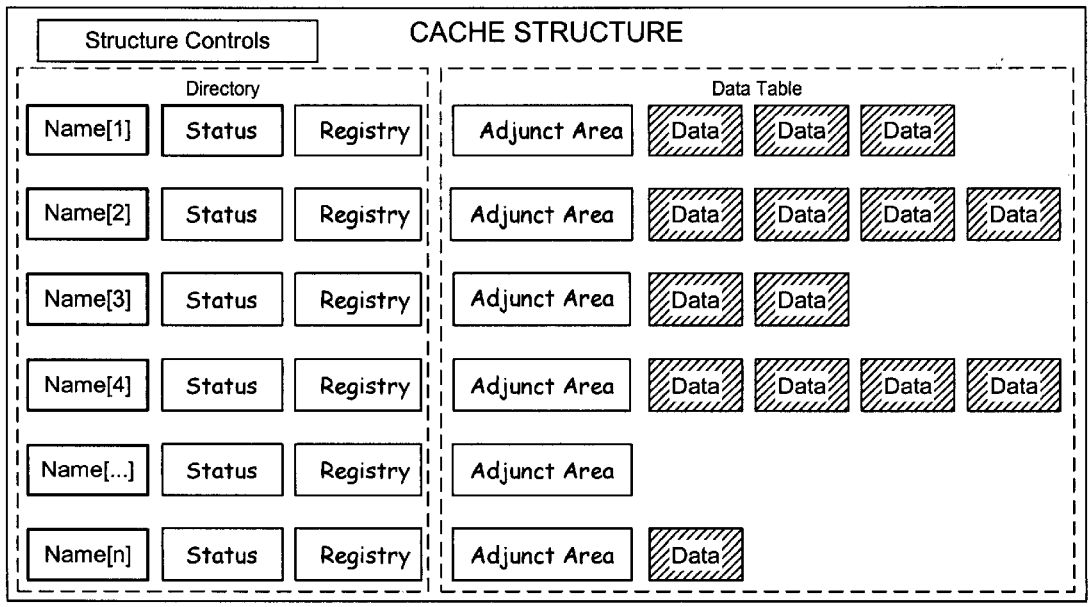
FIG. 5 depicts a block diagram representation of a cache structure in the coupling facility (CF) of FIG. 1.

Coupling Facility Architecture—Cache structure—FIG. 5

In FIG. 5, a block diagram of the cache structure of a coupling facility 9 of FIG. 1 is shown. The cache structure is like that described in U.S. Pat. No. 5,317,739 (see FIG. 5 therein). In the cache structure of FIG. 5 of the present specification, the Directory includes, for example, Name, Status and Registry information which are all control information. The Data Table includes Adjunct Area information, together with Data information. The Data information is non-control information while the Adjunct Area information is control information. The Data information that is stored in the non-control storage 14-2 of FIG. 1 is shown by cross-hatching. Accordingly, the Data information of FIG. 5 is stored in the non-control storage 14-2 of the storage 14 of FIG. 1 while the Name, Status, Registry, and Adjunct Area information is stored within the control storage 14-1 of FIG. 1. The control objects and data objects in the cache structure of FIG. 5 are represented in separate virtual spaces as represented by control storage 14-1 and non-control storage 14-2, respectively.

Figure 6:
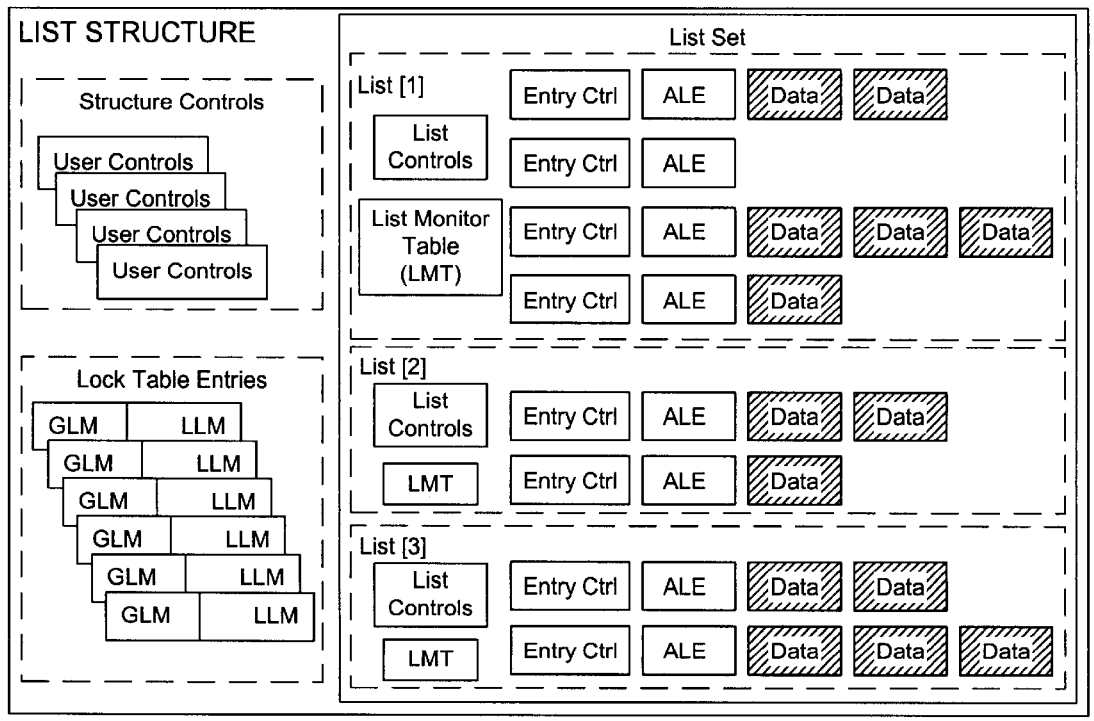
FIG. 6 depicts a block diagram representation of a list structure in the coupling facility (CF) of FIG. 1.

Coupling Facility Architecture—List structure—FIG. 6

The list structure of FIG. 6 is analogous to the list structure shown, for example, in U.S. Pat. No. 5,317,739 (see FIG. 6 therein). The list structure includes Structure Controls, Lock Table Entries and a List Set. The List Set in the particular example of FIG. 6 includes List [1], List [2] and List [3]. Each list in the List Set includes List Controls, a List Monitor Table, Entry Controls (Ctrl), ALE (Adjunct List Entry) and Data. The Data information is stored in the non-control storage 14-2 of FIG. 1 and is shown by cross-hatching and all the other information is control information stored in the control storage 14-1 of FIG. 1. The control objects and data objects in the list structure of FIG. 6 are represented in separate virtual spaces as represented by control storage 14-1 and non-control storage 14-2, respectively.

Figure 7:
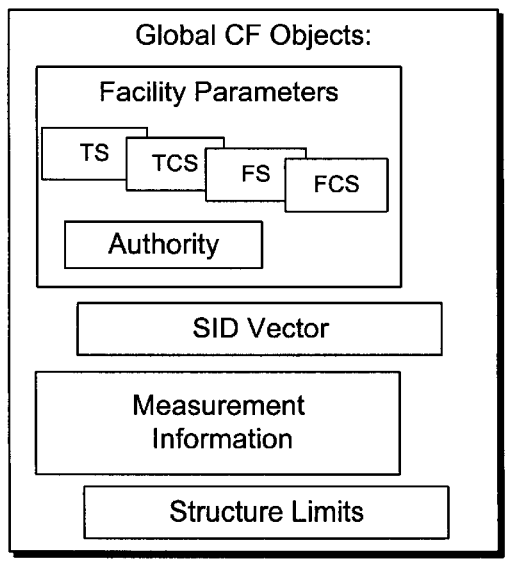
FIG. 7 depicts a block diagram representation of global objects used in the coupling facility (CF) of FIG. 1.

Global CF Objects—FIG. 7

In FIG. 7, global CF objects used by the coupling facility 9 of FIG. 1 are shown and are of the type described in U.S. Pat. No. 5,317,739. The objects include, for example, the total storage (TS) available, the total control storage (TCS) available, the amount of free storage (FS) and the amount of free control storage (FCS). The SID vector indicates the availability of structures in the storage. The measurement information is used to store the CPU performance of the CPUs. The Structure Limits information is used to specify any particular limitations on structures.

Figure 8:
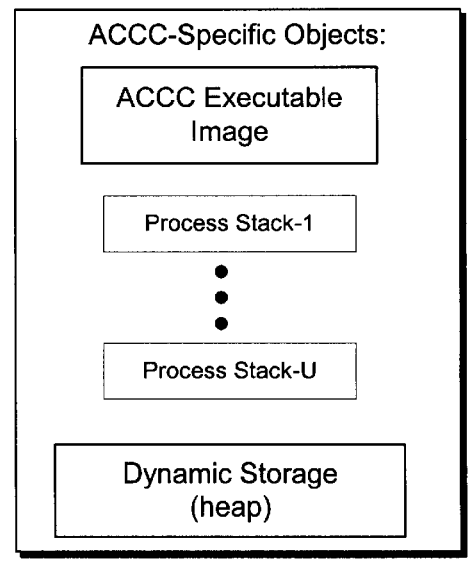
FIG. 8 depicts a block diagram representation of coupling code objects used in the coupling facility (CF) of FIG. 1.

ACCC Specific Objects—FIG. 8

In FIG. 8, the control code (ACCC Executable Image) for implementing the operations described in the present application over above those shown in FIG. 7 are identified. The control code causes the dynamic address translation to be carried out in the manner described in the present specification. The control code for each of the CPUs 11 of FIG. 1 uses a Process Stack in connection with elemental operations. Each stack in connection with processing control code has elements pushed onto and popped from the stack. In particular for dynamic address translation, Process Stacks are used in connection with executing commands affecting the structures. The Dynamic Storage (heap), among other things, maintains the DAT information including the translation tables necessary for dynamic address translation.

The allocation process of an individual structure using virtual addressing model is as follows:

During the initialization of the system 2 of FIG. 1, tables are built and stored in the $XT_1$ location of storage 14 (see FIG. 1) to track a free pool of real storage increments (SIs) that are available for structure allocation.

When a particular structure allocation command is received for processing by a CPU 11, sufficient storage increments (SIs) are removed from the free pool in the $XT_1$ location of storage 14 to accommodate the requested structure size (if available). Then, DAT and ART tables (see FIG. 2 and FIG. 3) that are unique to this particular structure are constructed and stored in the Structure Controls (see FIG. 5 and FIG. 6) to map the newly-acquired SIs to virtual addresses.

Separate virtual spaces are used to house the structure's control objects (stored in control store 14-1, see FIG. 1) and data objects (stored in data store 14-2, see FIG. 1), the sizes of which are based on the requested ratio of entries (control objects) to elements (data objects). One or more virtual spaces are used to map the control objects. If the structure has data objects, one or more virtual spaces are used to map the data objects. Both classes of objects (control and data) appear to exist in linear addressing continuum, where each virtual space of a particular object type (control or data) immediately follows the previous one (control or data).

When a subsequent structure allocation command requests expansion of the same particular structure, additional free SIs are removed from the free pool in storage location $XT_1$ and the structure's DAT tables in the Storage Control of the particular structure are extended, adding the newly-allocated storage to the structure while retaining the appearance of a virtual continuum in the control objects' and data objects' virtual spaces.

When a subsequent structure allocation command requests contraction of the same particular structure, sufficient DAT table entries in the Structure Control for the particular structure are invalidated to reduce the size of the affected objects. Storage increments (SIs) that are no-longer needed to map the structure are returned to the system's free pool in the $XT_1$ location of the storage 14.

Reapportionment of entries (control objects) and elements (data objects) within a particular structure uses a combination of contraction and expansion to effect changes in the respective objects' DAT tables stored in the Structure Controls of the particular structure.

When a deallocation command for a particular structure is executed, the DAT and ART tables, stored in the Structure Controls of that particular structure, that map the addresses for that particular structure are invalidated and the storage increments (SIs) are returned to the system's free pool in the $XT_1$ location of the storage 14.

Structure segregation is enforced by having a structure's storage allocated in virtual addressing space. The real storage increments (SIs) that comprise a structure are only accessible within the virtual context of the structure. A structure's SIs cannot be accessed outside of the structure's virtual context. Segregation of structures is achieved by having a CPU 11 execute only in a single structure's virtual context. A CPU 11 executes in a single structure's virtual context as follows:

When a CPU 11 is waiting for work, it runs in a restricted common addressing mode where it has access only to the ACCC Executable Image, a Processor Stack space, and a system-wide Dynamic Storage (heap) as indicated in FIG. 8.

When a CPU 11 executes a structure-related command, it establishes the virtual context of the particular structure by loading the appropriate control registers that regulate the DAT and ART hardware. The DAT and ART hardware (see FIG. 2 and FIG. 3) are loaded only from the Structure Control (see FIG. 5 and FIG. 6) for the particular structure.

When a CPU 11 concludes the execution of a structure-related command for a particular structure, the CPU 11 reverts to the restricted, common address space where it has access only to the ACCC Executable Image, a Processor Stack space, and a system-wide Dynamic Storage (heap) as indicated in FIG. 8.

Advantages in using virtual address translation to map a particular structure's components include:

Coupling control code is not required to simulate continuity in the accessing of discontiguous physical storage increments (SIs). Unburdening the control code through use of virtual contiguous addressing achieves substantial performance improvement by reducing the instruction path length needed to access various structure objects.

Objects which ordinarily would share a common addressing space among all structures are segregated into separate virtual spaces for each structure. Furthermore, control and data objects within the same structure are segregated into separate virtual spaces. By segregating a structure's control and data objects, the possibility of undetected programming errors resulting in storage corruption is reduced and system reliability is improved.

Unlike discontiguous SI models where parts of control storage SIs are used to avoid having an object span an SI, the virtual-memory model provides a linear continuum of addressing where control objects do not span SIs thereby avoiding the need for wasting of control storage.

Advantages in using the extended-real addressing features in conjunction with virtual mapping of structures includes:

Using the extended-real addressing implementation, expanded storage is eliminated so that all structure objects are maintained in a single central storage. This elimination of expanded storage eliminates the overhead associated with migrating pages of data objects between central and expanded storage during structure contraction.

The aggregate control storage size can be larger than two gigabytes whereas the previous CF implementations were restricted to an aggregate control storage size of approximately 2 GB. The use of extended-real addressing allows for an individual structure to have control objects greater than 2 GB (for example, cache structure directories, lock tables, etc. can exceed 2 GB).

The situation where data objects have been stored in control storage at non-contiguous locations never occurs and hence the need to find and collect those data objects in the control storage and to migrate them to non-control storage never arises. Hence, no time and resources are wasted on "clean up" operations.

Figure 9:
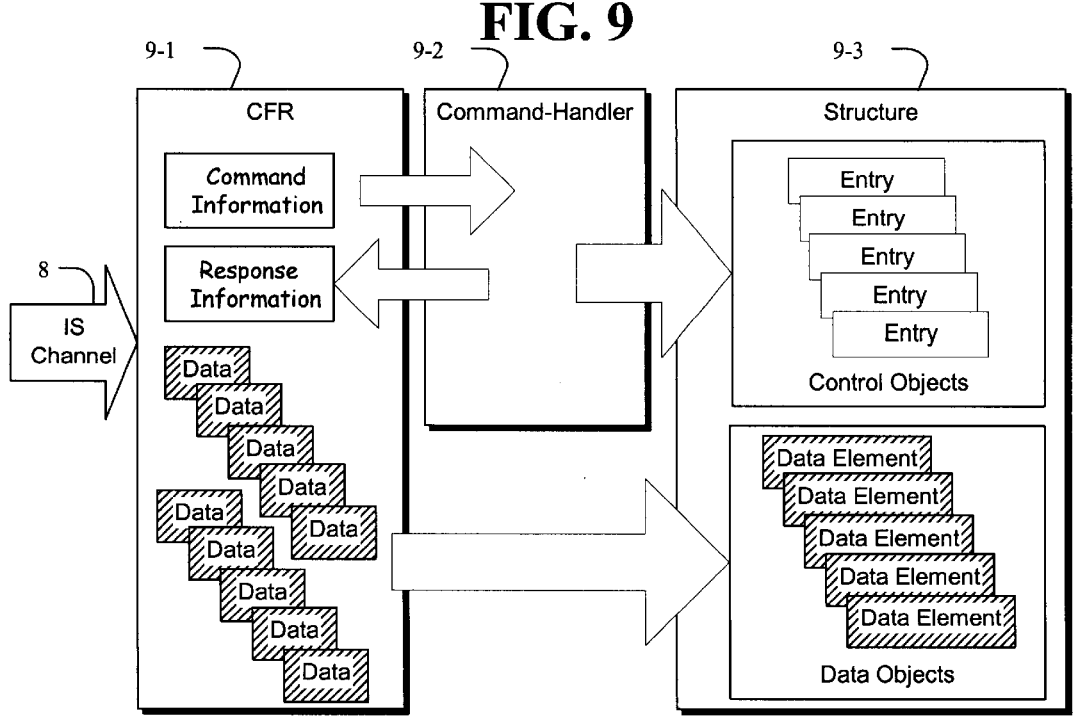
FIG. 9 depicts a block diagram representation of the operation of the coupling facility (CF) of FIG. 1.

Coupling Facility Operation—FIG. 9 In FIG. 9, an overview of the structure and operation of the coupling facility 9 of FIG. 1 is shown. Information is input to the coupling facility from the IS links 8. Information is generally of two types, control information (control objects) or non-control information (data objects). The control information includes commands for processing structures. The commands are, for example, create, write, read, update or delete. The commands affect particular objects in the structures in the coupling facility 9 on behalf of the attaching central processing complex (CPC) 10. In response to certain commands, the coupling facility 9 may notify the attaching CPC 10 of state changes in structure objects.

The transfer of information and the execution of commands in FIG. 9 occurs when the channel facility receiver (CFR) passes a channel command received over an IS channel 8 to the command-handler 9-2 for processing. The command-handler 9-2 is a part of the FIG. 7 and FIG. 8 code together with the CPU 11 upon which the code executes. As a function of the processing in command-handler 9-2, the structure 9-3, representing the structures S1 or S2, for example, of FIG. 1, may have control storage 14-1 modified with an Entry (Control Object). Similarly, without command handler 9-2 processing, data elements (data objects) via the CFR 9-1 are accessed directly in the structure 9-3 (that is, directly in the non-control storage 14-2 of FIG. 1).

The overall operation of the coupling facility 9 of FIG. 1 to carry out commands using the global CF objects of FIG. 7 and the ACCC specific objects of FIG. 8 is well known in IBM, Amdahl and other systems and is generally of the nature described in the system of U.S. Pat. No. 5, 317,739 except that, in this specification, the coupling facility 9 includes a dynamic address translator and virtual addressing.

The operation of the FIG. 1 system according to FIG. 9 is in different modes. One mode is with standard S/390 system addressing using a central storage and the expanded storage feature. Another mode of operation is with a 40-bit extended real addressing feature as described, for example, in connection with FIG. 4, together with dynamic address translation for virtual addressing within the coupling facility. Another mode uses a full 64-bit addressing with dynamic address translation for virtual addressing within the coupling facility.

Central Storage/Expanded Storage Operation—FIG. 10—FIG. 14

In FIG. 10 through FIG. 14, a representation of how the storage 14 of FIG. 1 adds and deletes objects with structures 1, 2, 3 and 4. In FIG. 10 through FIG. 14, the shaded blocks represent information which is non-control data objects and the clear boxes represent information which is control objects.

Figures 10, 11, 12:
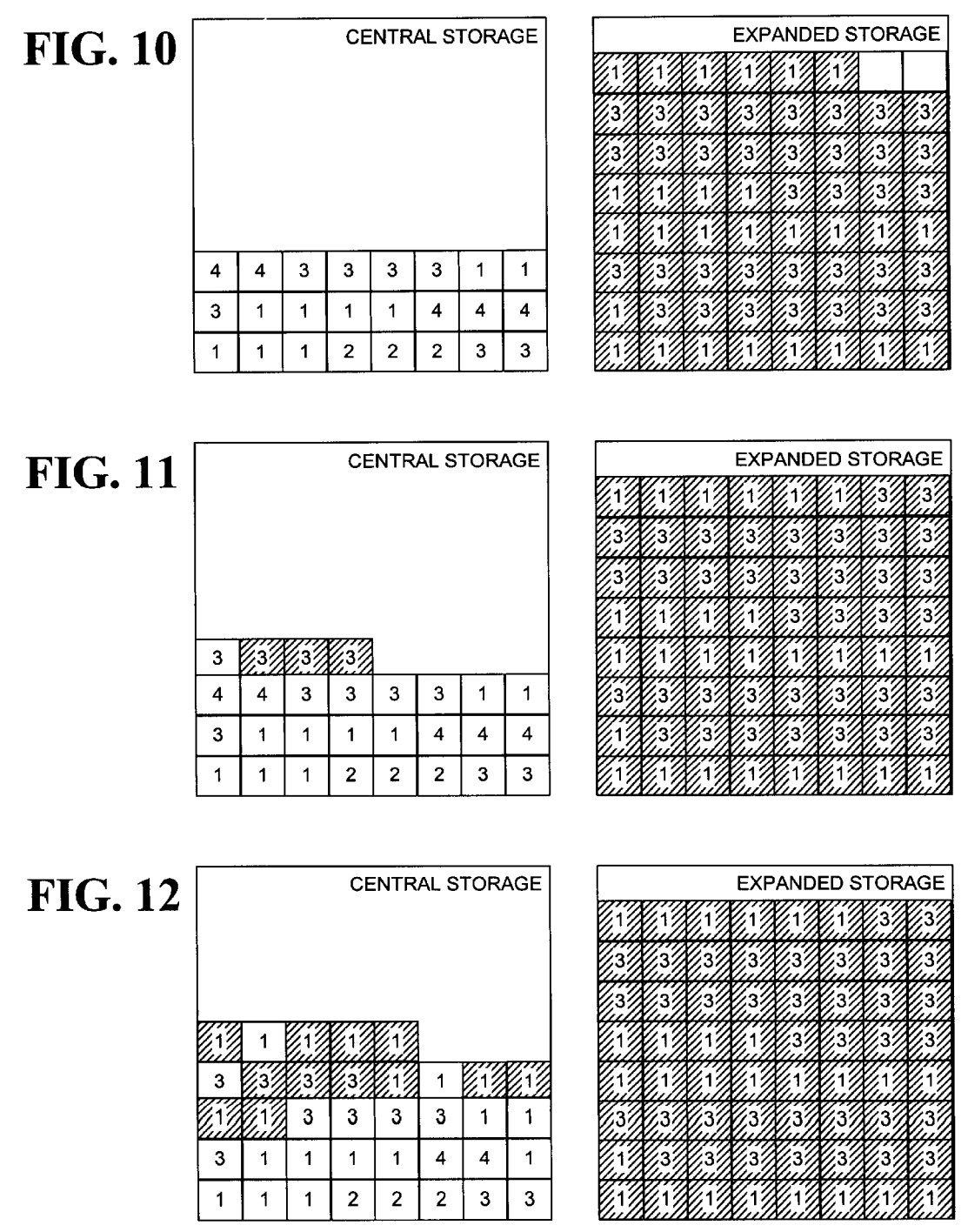

Referring to FIG. 10, a snapshot of memory exists where the expanded storage is almost full, and up until this point, all of the non-control data objects have been stored in expanded storage and only control objects have been stored in the central storage. In FIG. 10, structures 1 and 3 have both control objects and data objects structures 2 and 4 only have control objects in the central storage.

In FIG. 11, changes are made to the FIG. 10 representation by increasing the number of control objects and non-control data for the structure 3. The last two empty locations in the expanded storage of FIG. 10 are filled with non-control data for structure 3 in FIG. 11. The central storage in FIG. 11, stores a new control objects and additionally stores the three additional non-control data objects for structure 3. At this point in time, for this example, the central storage includes both control objects and non-control data.

Referring to FIG. 12, the state of FIG. 11 is modified by the addition of additional structure 1 information and non-control data information. All of the changes in FIG. 12 occur in the central storage since the expanded storage at this point in time has no room for additional information.

Figure 13:
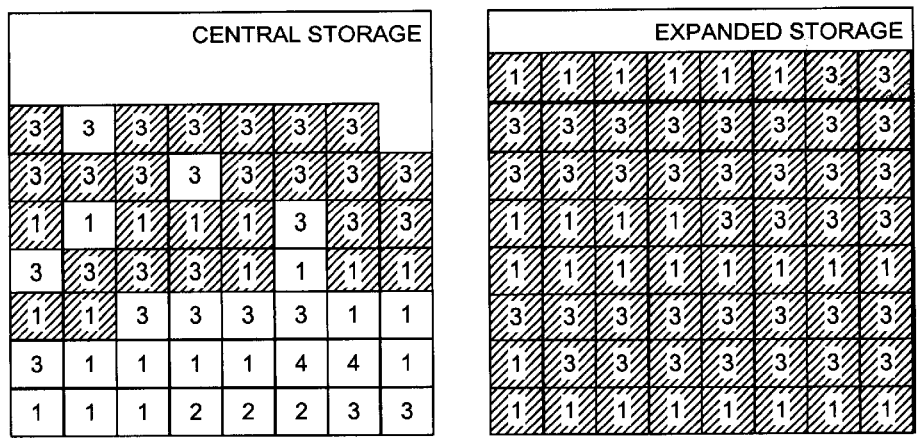

Referring to FIG. 13, additional changes are made to the structure 3 by addition of control objects and non-control information in the central storage.

Figure 14:
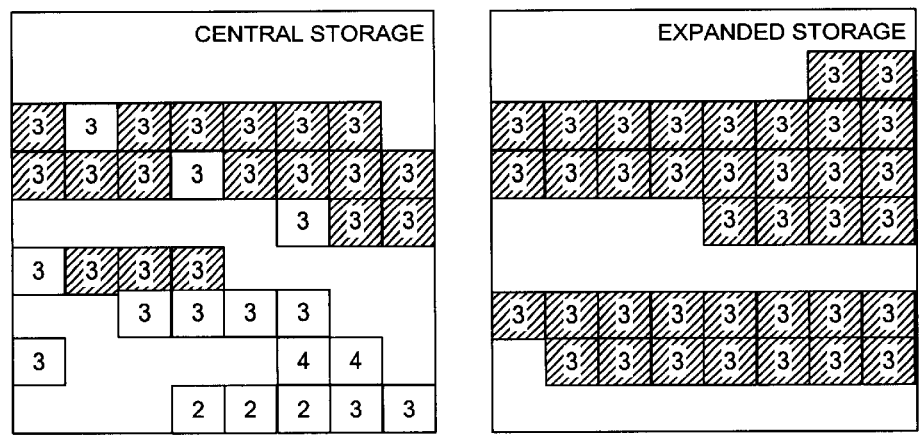

Referring to FIG. 14, delete command delete the non-control data and the control information for structure 1 leaving the central storage with both control and non-control information for structure 3 while the expanded storage includes non-control data for structure 3 control data for structure 2 and for structure 4 remain in the central storage in FIG. 14.

Referring to all of the FIG. 10 through FIG. 14 representations of central storage and expanded storage, it is apparent that the allocation of structures within the storage devices for any particular structure is non-contiguous. The CPU s in FIG. 1 accordingly must account for the location of the control information and the non-control information in both the central storage and in the expanded storage for a conventional S/390 operation. Hence much processing time is expended in keeping track of both control information and non-control information for each structure. In the FIG. 14 example, the location of the data objects 3 must be tracked both in the central storage and in the expanded storage. Alternatively, for simpler processing, the data objects 3can be moved from the central storage to the expanded storage. However, such movement also requires time and resources that degrade system performance.

Figure 15:
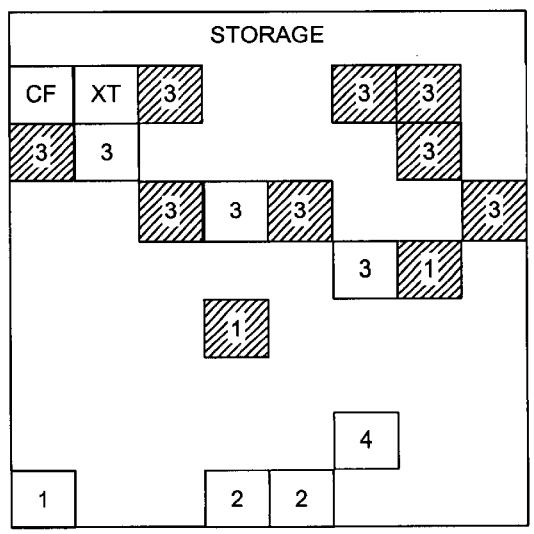
FIG. 15 through FIG. 18 depict representations of storage when the coupling facility (CF) of FIG. 1 is operating in the virtual storage mode.

Single Storage Allocation with Control Information and non-Control Information—FIG. 15

In FIG. 15, the physical addresses of an exemplary operation with structures 1, 2, 3 and 4 present is shown. Note that the coupling facility code (CF) is stored for example in the lowest order address followed by the translation tables. Thereafter, within the storage, the physical addresses of structures is allocated throughout the storage unit, broken into control code objects (clear) and non-control objects (shaded). Although FIG. 15 is the address allocation for one example based on physical addresses, the operation of the coupling facility of FIG. 1 relies on logical addresses and the actual physical addresses if FIG. 15 are determined by the dynamic address translation facilities in FIG. 1.

Figure 16:
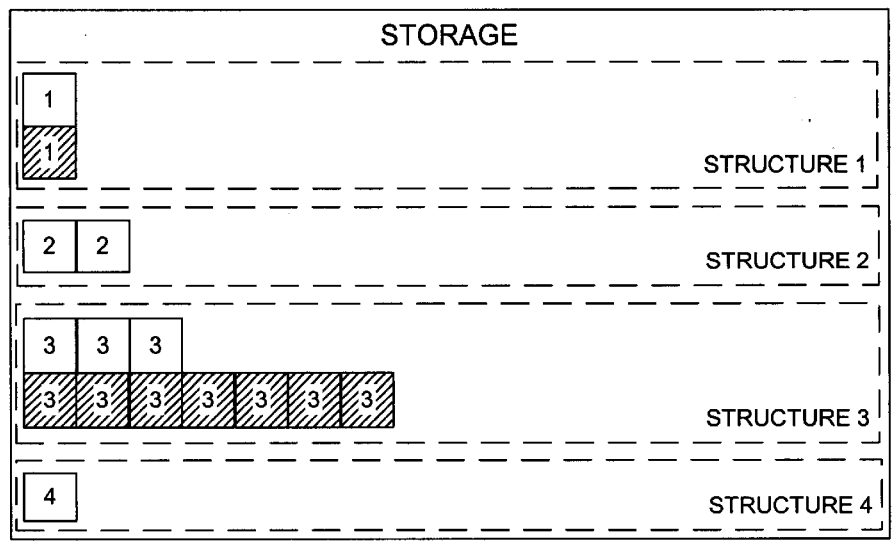
Figure 17:
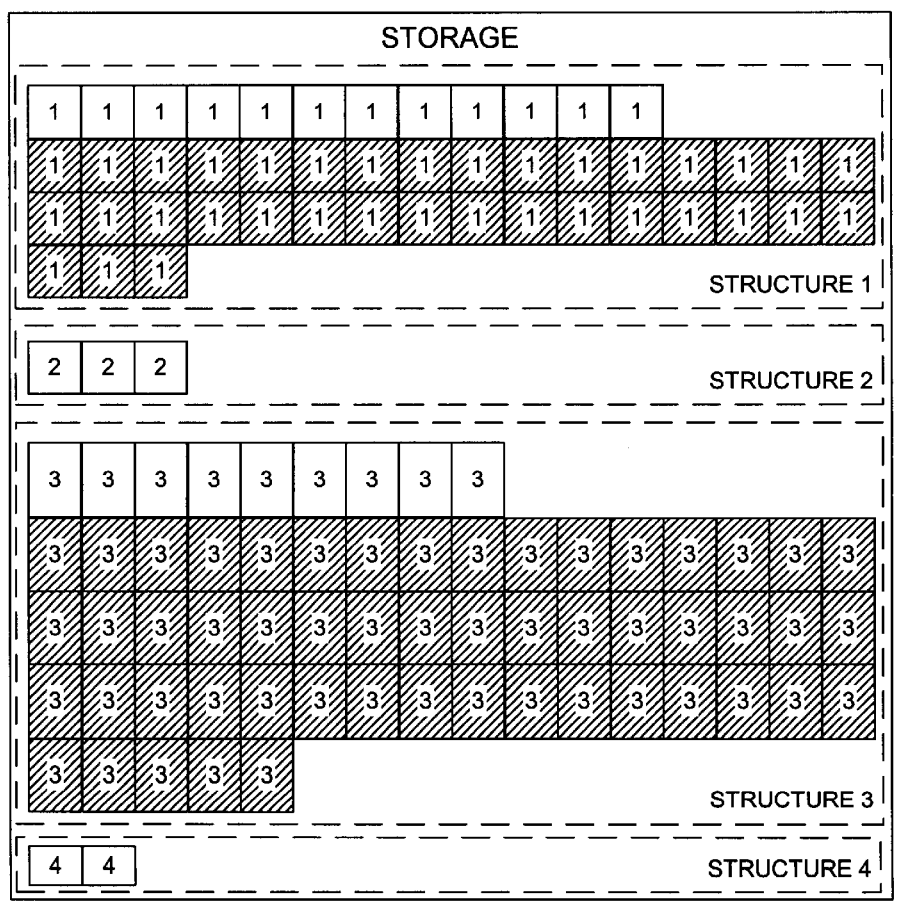
Figure 18:
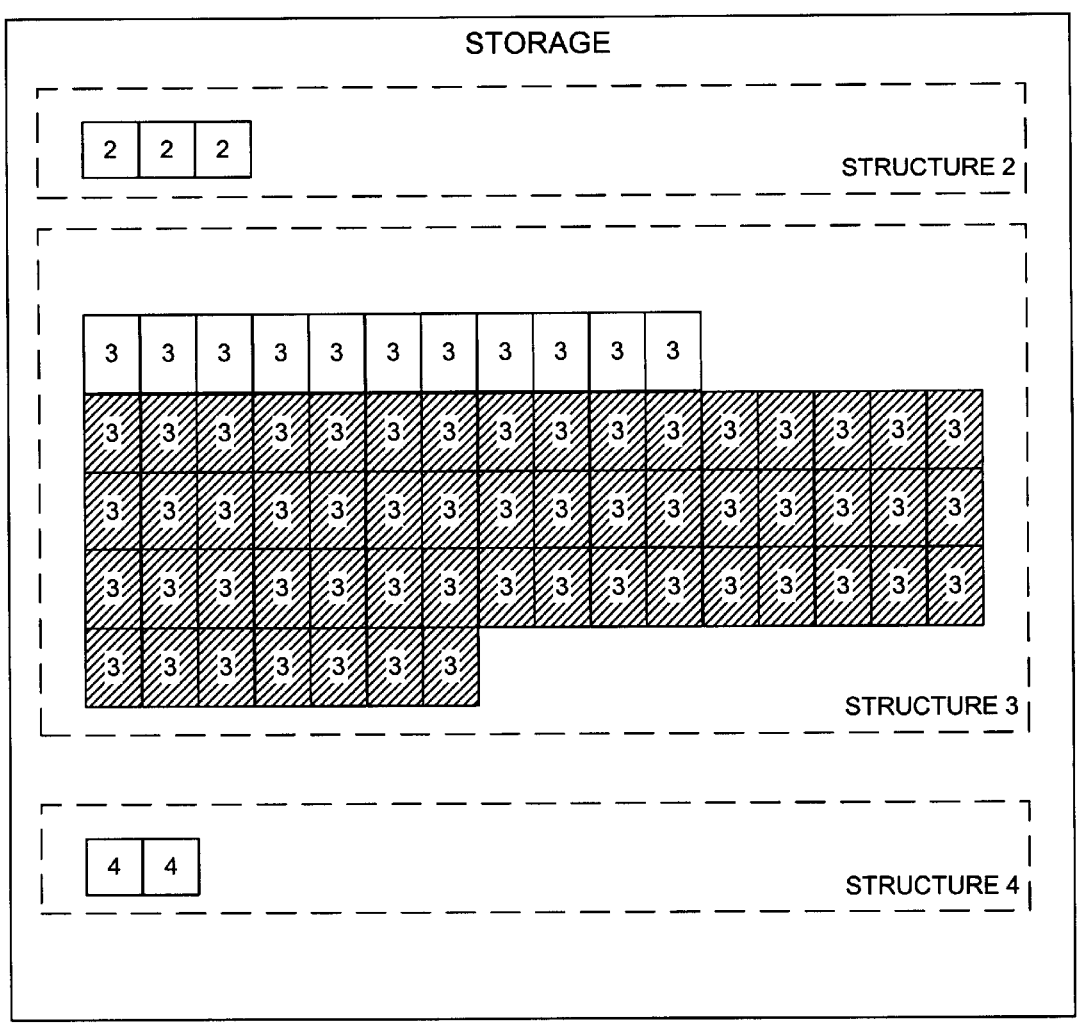

Logical Address Operation—FIG. 16 through FIG. 18

FIG. 16 through FIG. 18 are illustrations of structures being mapped to multiple virtual spaces. In FIG. 16 through FIG. 18, storage increments are arranged horizontally to depict a virtual spaces; a full line of sixteen SIs represents a two gigabyte virtual space. A two gigabyte space divided into sixteen storage increments yields an SI size of 256 megabytes. This SI size is used for illustrative purposes only. All current CF models use a storage increment size of 256 kilobytes. Note that for clarity, FIG. 16 through FIG. 18 do not show the ACCC Coupling Code Image, processor-specific locations (for example, Processor Stacks and trace tables) and Dynamic System Storage (heap).

In FIG. 16, the logical addresses for the control and non-control data for the structures 1, 2, 3, and 4 are shown corresponding to the physical addresses of FIG. 15. Note that the control objects appear first in one row defining one control virtual address space followed by the non-control data objects in contiguous address locations defining one data virtual address space for each of the different structures 1, 2, 3 and 4. In FIG. 16, the structure 1 consists of one control object and one data object. The structure 2 consists of only two control objects (for example, a directory-only cache structure or a lock-table-only list structure). The structure 3 consists of three structure increments for control objects and seven structure increments for data objects. The structure 4 consists of one structure increment for control objects.

Referring to FIG. 17, the logical addressing of the same data as it appears in FIG. 13 is shown. Note that in FIG. 17, the logical addresses have the structure increments for control objects contiguously occurring in the first row defining a control virtual address space followed by the contiguous placement of the non-control structure increments for data objects in subsequent rows defining a data virtual address space.

Referring to FIG. 18, the data structure with logical addressing analogous to the data structure of FIG. 14 is shown where the structure 1 has been deleted. In FIG. 18, the virtual addressing arranges the structure increments for virtual objects in neat contiguous rows whereas in FIG. 14, the structure increments for control and data objects are non-contiguous and scattered across both the central storage and the expanded storage.

System Specific Embodiments

In one preferred embodiment, a memory model is adopted where the size of control objects and data objects is restricted only by the total amount of memory in an ACCC configuration. For a system where the ACCC code is written for a single 31-bit addressing space, control objects can be represented to enable use of such 31-bit command-handler code without modification using the following rules:

Control objects within an individual structure are restricted to a single two gigabyte addressing space. The control objects coexist in the address space with the ACCC executable image, process stacks, heap, I/O buffers, etc.

The aggregate control object size for all structures remains unrestricted.

Data objects are maintained in multiple data spaces. Command-handler functions do not require direct access to data objects. Rather, access to data objects is encapsulated in storage-management service functions that are called by ACCC command-handler code.

While the invention has been particularly shown and described with reference to preferred embodiments thereof it will be understood by those skilled in the art that various changes in form and details may be made therein without departing from the scope of the invention.

What is claimed is:

1. A system for sharing data among two or more processes executing in the system comprising:

one or more central processing complexes for executing said two or more processes, one or more inter-system channels, each inter-system channel connected to one of said central processing units, a coupling facility including, one or more coupling facility receivers, each receiver connect to one of said inter-system channels for making transfers between the coupling facility and the connected central processing complex, storage, connected to the coupling facility receivers, for storing control objects and data objects according to virtual addresses having corresponding real addresses in one or more structures, where the real address are translatable from the virtual addresses, one or more CPUs, connected to the coupling facility receivers and to the storage, for controlling the operation of the coupling facility, each of said CPUs including a dynamic address translator for translating said virtual addresses to said real addresses.

2. The system of claim 1 wherein the control objects for a particular structure are stored in virtual control storage and wherein data objects for said particular structure are stored in virtual non-control storage whereby the virtual control storage and the virtual non-control storage for a structure are segregated.

3. The system of claim 1 wherein said control objects are stored in storage increments addressed in virtual control storage and said data objects are stored in storage increments addressed in virtual non-control storage.

4. The system of claim 3 wherein said storage increments addressed in virtual control storage are contiguous and wherein said storage increments addressed in virtual non-control storage are contiguous.

5. The system of claim 3 wherein said storage increments addressed in virtual control storage define a virtual address control space for a particular structure and wherein said storage increments addressed in virtual non-control storage define a virtual address non-control space for said particular structure.

6. The system of claim 5 wherein said control objects are stored in contiguous virtual locations in said control space and said data objects are stored in contiguous virtual locations in said virtual address non-control space.

7. The system of claim 6 wherein said contiguous virtual locations in said control space provide a linear addressing continuum in said control space and wherein said contiguous virtual locations in said virtual address non-control space provide a linear addressing continuum in said non-control space.

8. The system of claim 7 wherein the linear addressing continuum in said control space allows control objects to span multiple storage increments thereby conserving structure space.

9. The system of claim 1 wherein said CPUs use said dynamic address translators to cause said control objects to be stored in storage increments addressed in contiguous virtual control storage that defines a virtual address control space for a particular structure and wherein said CPUs use said dynamic address translators to cause said data objects to be stored in storage increments addressed in contiguous virtual non-control storage defining a virtual address non-control space for said particular structure thereby providing hardware isolation of structures and objects within structures.

10. The system of claim 1 wherein said central processing complexes include any platform having inter-system channels.

11. The system of claim 10 wherein said central processing complexes include S/390 platforms.

12. The system of claim 11 wherein said central processing complexes use extended-real addressing to extend the aggregate amount of storage available to the system for control objects.

13. The system of claim 1 wherein said storage includes only central storage and does not include expanded storage.

14. The system of claim 1 wherein said storage includes a single virtual addressing space for a structure's control objects.

15. The system of claim 1 wherein said dynamic address translator includes,
a virtual address register for storing said virtual addresses,
a real address register for storing said real address,
page tables for storing a real address fields having a real addresses corresponding to the virtual addresses,
segment tables for storing a page table origins of page tables having real addresses corresponding to the virtual addresses,
selector means for selecting segment tables for use in dynamic address translation.

16. The system of claim 15 further including an access register translator and wherein said selector means selects segment tables from said access register translator.

17. A method for sharing data among two or more processes comprising:
executing said two or more processes in one or more central processing complexes having one or more inter-system channels, each inter-system channel connected to one of said central processing units,
storing structures in virtual address space in a coupling facility including,
making transfers between the coupling facility and the connected central processing complex through one or more coupling facility receivers, each receiver connect to one of said inter-system channels,
storing control objects and data objects according to virtual addresses having corresponding real addresses in said structures, where the real address are translatable from the virtual addresses,
controlling the operation of the coupling facility with CPUs including dynamic address translators for translating said virtual addresses to said real addresses.

18. The method of claim 17 wherein the control objects for a particular structure are stored in virtual control storage and wherein data objects for said particular structure are stored in virtual non-control storage whereby the virtual control storage and the virtual non-control storage for a structure are segregated.

19. The method of claim 17 wherein said control objects are stored in storage increments addressed in virtual control storage and said data objects are stored in storage increments addressed in virtual non-control storage.

20. The method of claim 19 wherein said storage increments addressed in virtual control storage are contiguous and wherein said storage increments addressed in virtual non-control storage are contiguous.

21. The method of claim 19 wherein said storage increments addressed in virtual control storage define a virtual address control space for a particular structure and wherein said storage increments addressed in virtual non-control storage define a virtual address non-control space for said particular structure.

22. The method of claim 21 wherein said control objects are stored in contiguous virtual locations in said control space and said data objects are stored in contiguous virtual locations in said virtual address non-control space.

23. The method of claim 22 wherein said contiguous virtual locations in said control space provide a linear addressing continuum in said control space and wherein said contiguous virtual locations in said virtual address non-control space provide a linear addressing continuum in said non-control space.

24. The method of claim 23 wherein the linear addressing continuum in said control space allows control objects to span multiple storage increments thereby conserving structure space.

25. The method of claim 17 wherein said CPUs use said dynamic address translators to cause said control objects to be stored in storage increments addressed in contiguous virtual control storage that defines a virtual address control space for a particular structure and wherein said CPUs use said dynamic address translators to cause said data objects to be stored in storage increments addressed in contiguous virtual non-control storage defining a virtual address non-control space for said particular structure thereby providing hardware isolation of structures and objects within structures.

* * * * *